United States Patent [19]
Adams et al.

[11] Patent Number: 5,924,337
[45] Date of Patent: *Jul. 20, 1999

[54] DRIVE UNIT WITH A HYDRODYNAMIC RETARDER AND TRANSMISSION

[75] Inventors: Werner Adams, Crailsheim; Peter Edelmann, Heidenheim; Jurgen Friedrich; Peter Heilinger, both of Crailsheim; Peter Rose, Heidenheim; Klaus Vogelsang, Crailsheim, all of Germany

[73] Assignee: Voith Turbo GmbH & Co. KG, Heidenheim, Germany

[ * ] Notice: This patent is subject to a terminal disclaimer.

[21] Appl. No.: 08/756,583

[22] Filed: Nov. 27, 1996

[30] Foreign Application Priority Data

Nov. 28, 1995 [DE] Germany ............................ 195 44 189

[51] Int. Cl.⁶ .............................. F16H 57/02; B60T 13/04
[52] U.S. Cl. ......................... 74/606 R; 188/269; 188/272
[58] Field of Search ...................... 74/606 R; 192/109 F, 192/3.29, 35; 188/296, 269, 272; 91/446, 447

[56] References Cited

U.S. PATENT DOCUMENTS

| | | | |
|---|---|---|---|
| 3,297,114 | 1/1967 | Erdman | 188/90 |
| 3,367,461 | 2/1968 | Nagel | 192/35 |
| 3,633,714 | 1/1972 | Klaue | 188/134 |
| 3,640,359 | 2/1972 | Clark et al. | 188/274 |
| 3,650,358 | 3/1972 | Bessiere | 188/296 |
| 4,235,320 | 11/1980 | Polak et al. | 192/4 B |
| 4,321,990 | 3/1982 | Koch | 188/296 X |
| 4,405,038 | 9/1983 | Ternehall | 192/4 B |
| 5,064,029 | 11/1991 | Araki et al. | 188/267 |
| 5,285,872 | 2/1994 | Kaneda | 188/71.5 |
| 5,718,316 | 2/1998 | Gee | 192/109 F |

FOREIGN PATENT DOCUMENTS

| | | |
|---|---|---|
| 15 75 798 | 1/1970 | Germany . |
| 19446167 | 3/1970 | Germany . |
| 25 36 805 | 2/1977 | Germany . |
| 8613508 | 7/1986 | Germany . |
| 195 09 417 | 6/1996 | Germany . |

*Primary Examiner*—Vinh T. Luong
*Attorney, Agent, or Firm*—Baker & Daniels

[57] ABSTRACT

A drive unit for a vehicle which includes an engine, transmission and hydrodynamic retarder having a rotor and a stator. A retarder shaft is rotatably supported by two bearings and extends through the housing of the transmission. A sealing element provides a seal between the retarder shaft and the transmission housing for separating the operating medium of the hydrodynamic retarder from either the transmission lubricant or the lubricant for one of the two shaft bearings.

12 Claims, 3 Drawing Sheets

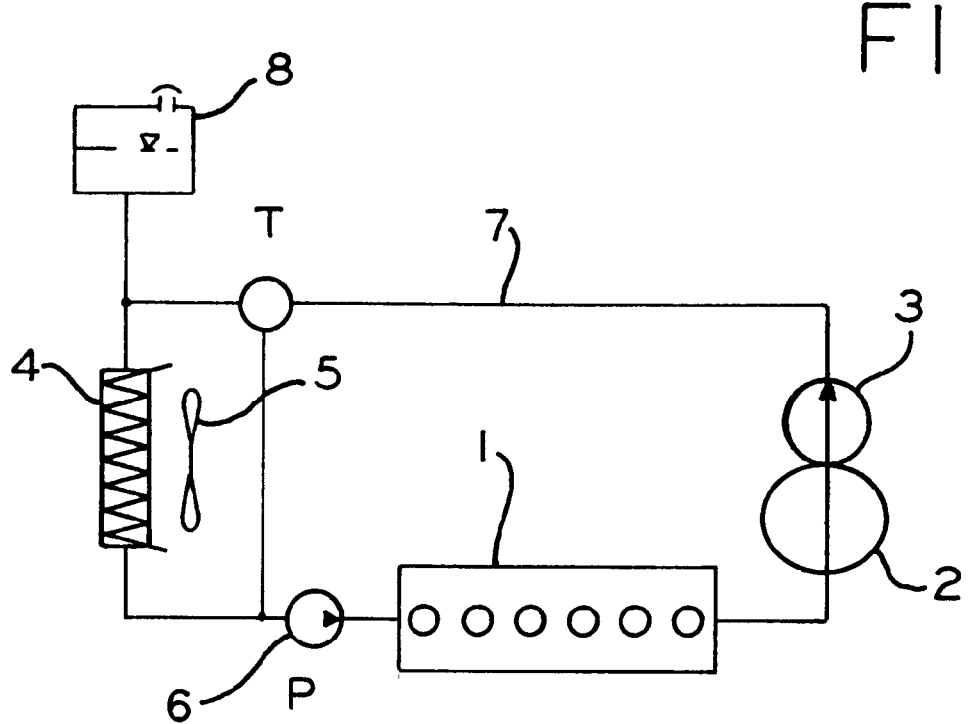
FIG_1

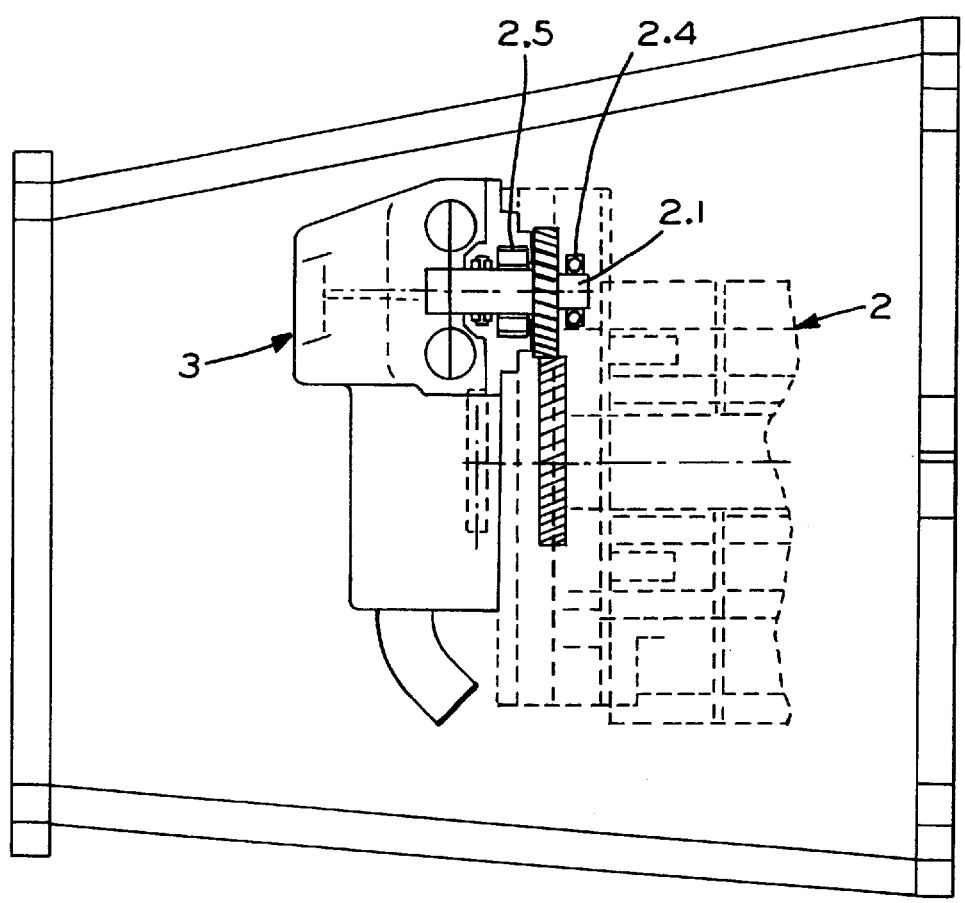

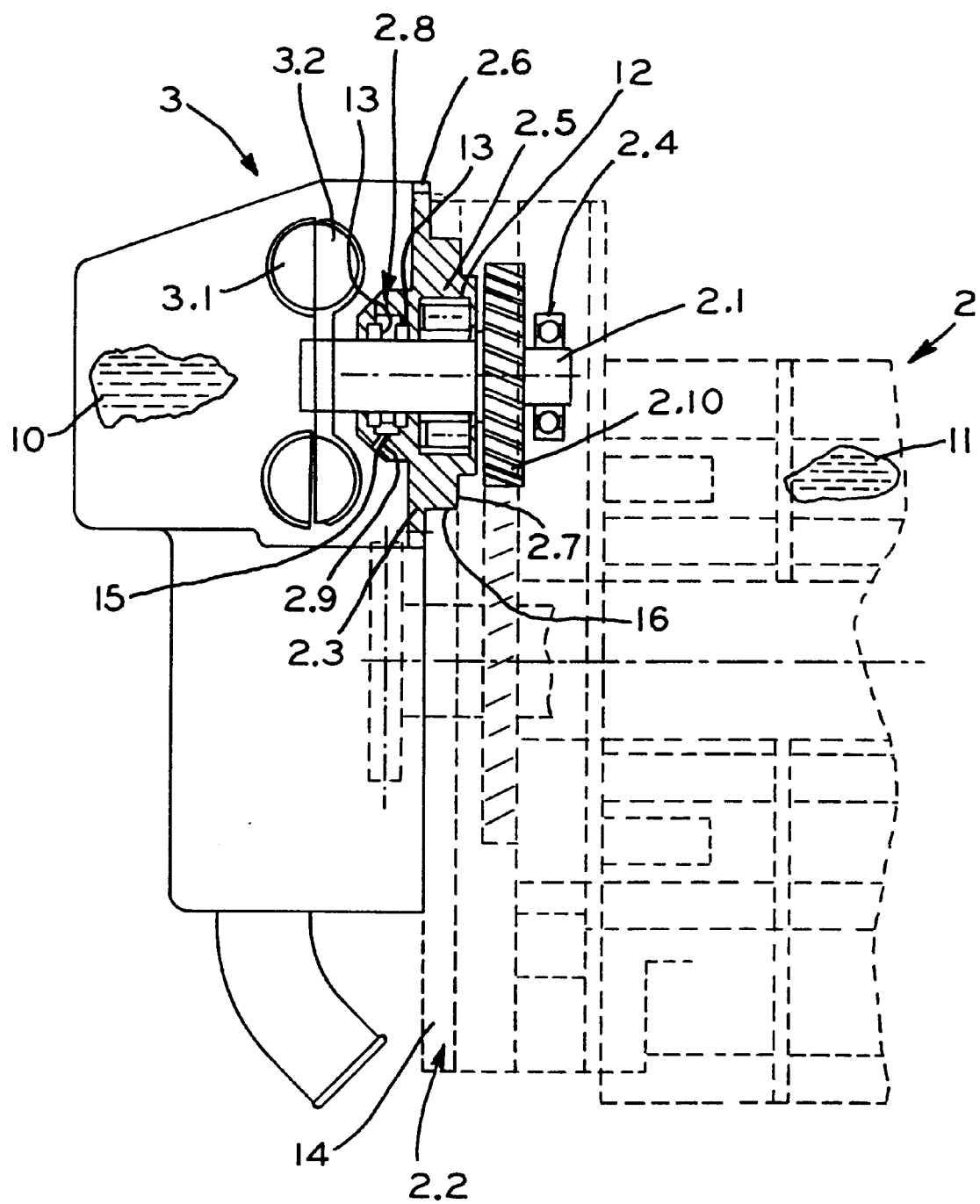
FIG_3

DRIVE UNIT WITH A HYDRODYNAMIC RETARDER AND TRANSMISSION

BACKGROUND OF THE INVENTION

The present invention concerns a drive unit for a motor vehicle having an engine, a hydrodynamic retarder and a transmission.

In vehicle drive systems, retarders play an ever more important role. Used in the motor vehicle, and also in systems with greatly changing operation, the retarder is turned on and off by charging the impeller-equipped working circuit with an operating medium and by draining it. Examples of suitable operating mediums are oil and water. When the retarder is engaged in braking action, the operating medium heats up. The heat must be removed by a radiator.

Drive units of motor vehicles normally include additional units that require cooling. The engine, the mechanical brakes, the clutch and the transmission are examples of such additional units. These other units may also feature a cooling circuit. It is known to operate the retarder in an automotive drive system with water which also serves as a coolant. In nonbraking operation, the retarder can be used selectively as a pump, and the operating medium of the retarder may, at the same time, serve as cooling medium for other units of the drive assembly.

DE 195 09 417 A1 shows and describes a drive train for a motor vehicle comprising an engine, a transmission and a retarder. The retarder is integrated in the end section of the transmission housing.

The objective underlying the present invention is to improve such a drive train to economize and simplify the manufacture and assembly of retarder and transmission to produce a less expensive retarder and transmission.

SUMMARY OF THE INVENTION

The objective of the present invention is met by utilizing a drive train having an engine, transmission and hydrodynamic retarder having a rotor and a stator wherein a retarder shaft is rotatably supported by two bearings and extends through the housing of the transmission and a sealing element provides a seal between the retarder shaft and the transmission housing for separating the operating medium of the hydrodynamic retarder from either the transmission lubricant or the lubricant for one of the two shaft bearings.

Differing from the prior art, the invention proposes an arrangement such that the retarder can be slipped on the retarder shaft as an independent module. The retarder shaft is supported by two bearings. In a preferred embodiment, the retarder shaft is fitted in a wall part which is an integral part of the transmission housing. The retarder shaft fitted in the wall part can protrude beyond it, so that the completely preassembled retarder can be slipped-on the retarder shaft.

According to the present invention, a packing is provided between transmission housing and retarder. The packing has a dual function: first, it seals against the lubricant of the retarder bearing and/or the transmission oil and, second, it seals against the operating medium of the retarder. The retarder can be operated with an operating medium other than oil, in which case it is necessary to ensure that the two mediums, namely the operating medium of the retarder, for one, and the lubricant of the transmission, for another, are not in conducting connection with each other. This is accomplished with the packing. Naturally, this does not preclude the use of identical mediums, thus, the retarder may also be operated with oil as operating medium.

An improvement of the invention may provide for fitting the packing, or sealing element, in the wall part of the transmission housing. This has the advantage of a particularly compact arrangement.

The sealing element may be designed as a single part or multiple part, e.g., as a double element.

In the preferred design of a double element, a clearance is provided between the two sealing elements. The clearance may be charged with a fluid acting as a barrier medium. An alternative design provides for charging the clearance with a gas, for instance air, and having it feature a leakage opening. This enables a quick and reliable identification of a leak.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 1 is a schematic view of the present invention.

FIG. 2 is an elevational view of a portion of the present invention.

FIG. 3 is an enlarged elevational view similar to FIG. 2.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplification is not to be construed as limiting the scope of the invention in any manner. The embodiment disclosed below is not intended to be exhaustive or limit the invention to the precise form disclosed in the following detailed description.

DESCRIPTION OF THE PRESENT INVENTION

FIG. 1 shows schematically a drive train comprising an engine 1, transmission 2, hydrodynamic retarder 3 with a coolant as operating medium, 10 a heat exchanger 4, a fan 5 coordinated with it, a circulation pump 6, cooling water lines 7 and an equalizing tank 8.

FIG. 2 is a partial view of an embodiment of the present invention, illustrating parts of the transmission 2 by dashed lines and the retarder 3. The retarder has a rotor impeller 3.1 and a stator impeller 3.2. In this embodiment, the retarder is fitted on a shaft 2.1 which, in turn, is fitted, among others, in an outside wall 14 of the transmission 2. This is shown in more detail in FIG. 3.

The transmission 2 possesses a housing 2.2 with a cover 2.3 fitted in the housing wall 14. The cover 2.3 is screw-joined to the remaining wall of the transmission housing 2.2 and sealed against said housing. The retarder shaft 2.1 is supported by means of two bearings 2.4 and 2.5, the bearing 2.4 is contained within the space enclosed by the transmission housing 2.2, while the bearing 2.5 is arranged in the cover 2.3.

Retarder 3 is preassembled as an independent module and is slipped on the retarder shaft 2.1 from outside. Slip-on of the retarder 3, partially assembled, is also conceivable.

Cover 2.3 features an outer bounding surface 2.6 on which the retarder module 3 is placed. Cover 2.3 also features an inner bounding surface 2.7 fitted in an appropriate recess 16 of the transmission housing 2.2.

Additionally, the cover 2.3 supports a seal in the form of packing 2.8. Packing 2.8 serves a dual function: it seals the annular clearance between cover 2.3 and retarder shaft 2.1, first, with regards to bearing lubricant 12, the transmission oil or other lubricant 11 and, second, it provides a seal against the operating medium 10 of the retarder 3 which is a cooling medium in the illustrated embodiment. The packing may be fashioned as a single sealing element or as a double sealing element comprising individual elements 13 having a clearance therebetween.

Also visible is a leakage bore 2.9 in the cover 2.3. Leakage bore 2.9 permits the outside removal of leakage fluid.

Furthermore, the retarder shaft 2.1 supports a pinion 2.10, which is an integral part of a gear-up arrangement for imparting higher rpm to the retarder shaft 2.1. The pinion may be of single-part or multiple-part design, depending on the availability of space and the desired gear ratio.

On the retarder 3, the rotor impeller 3.1 and stator impeller 3.2 may be switched in axial direction, so that, as opposed to the configuration shown in FIG. 3, the rotor impeller 3.1 is nearer the cover 2.3 than the stator impeller.

In some embodiments, the retarder shaft 2.1 may be either an entirely hollow or partially hollow shaft.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A drive unit for a motor vehicle having an engine, said drive unit comprising:

a transmission, said transmission having a transmission housing containing a transmission lubricant;

a retarder on said transmission housing having an operating medium and a cooperatively disposed rotor and stator therein;

a retarder shaft having said rotor mounted thereon;

two bearings rotatably supporting said shaft; and a sealing element disposed between said transmission housing and said retarder; said sealing element sealingly separating said operating medium from one of said transmission lubricant and a lubricant for one of said two bearings.

2. The drive unit of claim 1 wherein said retarder shaft is operatively connected to said transmission.

3. The drive unit of claim 1 wherein said transmission housing defines an outside wall of said transmission, and said retarder shaft extends through an aperture in said outside wall and protrudes freely beyond said outside wall.

4. The drive unit of claim 1 wherein said transmission housing defines an outside wall of said transmission and said sealing element is disposed on said retarder shaft and within said outside wall.

5. The drive unit of claim 1 wherein said outside wall comprises a cover joined to a remaining portion of said transmission housing and said outside wall supports one of said retarder and said retarder shaft.

6. The drive unit of claim 1 further comprising a gearing arrangement, said gearing arrangement including a pinion disposed on said retarder shaft.

7. The drive unit of claim 6 wherein said pinion consists of a single part.

8. The drive unit of claim 6 wherein said pinion is disposed on said retarder shaft between said two bearings.

9. The drive unit of claim 1 wherein said shaft is at least partially hollow.

10. The drive unit of claim 1 wherein said seal element is a double sealing element.

11. The drive unit of claim 10 wherein said double sealing element comprises individual sealing elements having a clearance therebetween.

12. The drive unit of claim 11 wherein said clearance has an opening whereby leakages are detectable.

* * * * *